UNITED STATES PATENT OFFICE.

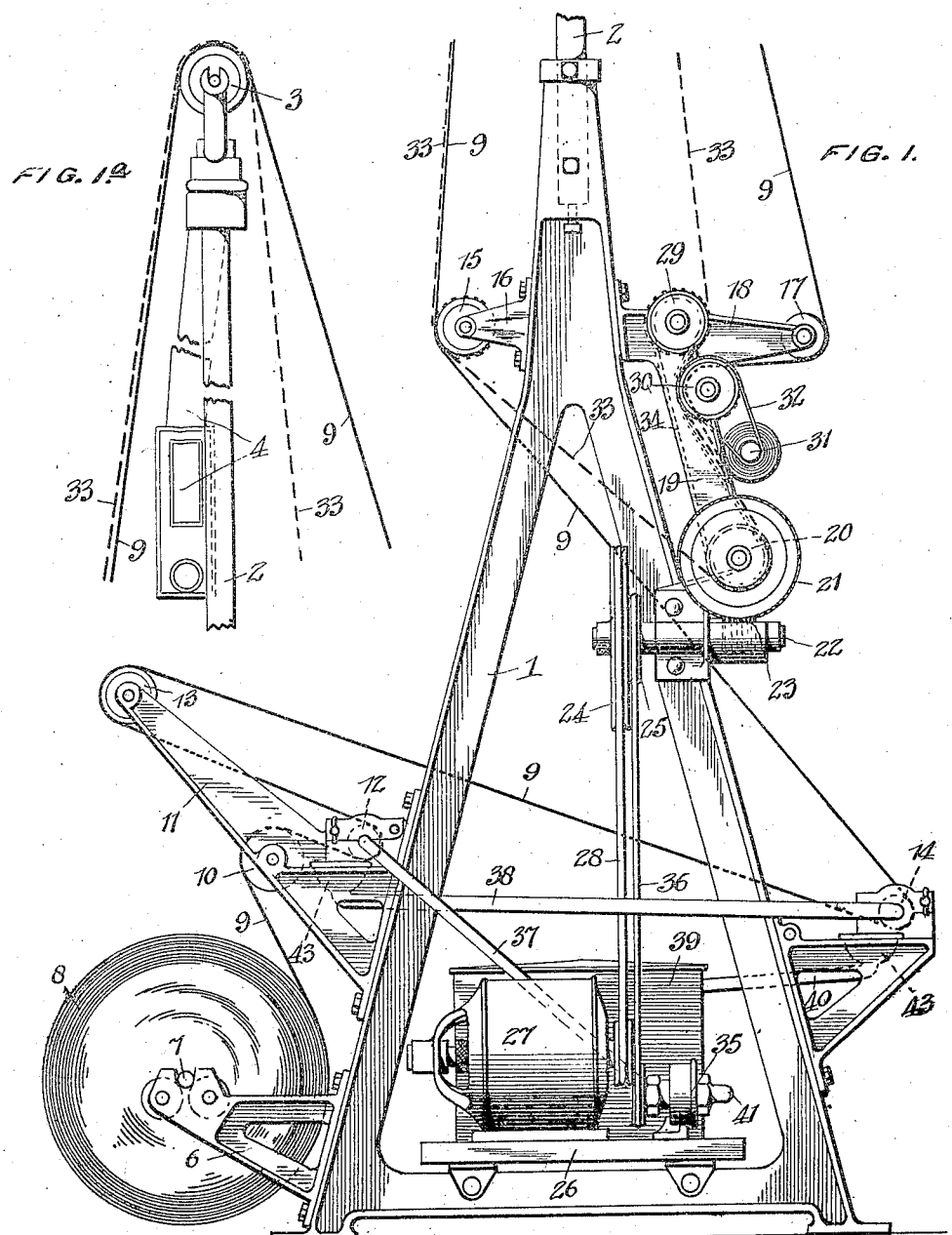

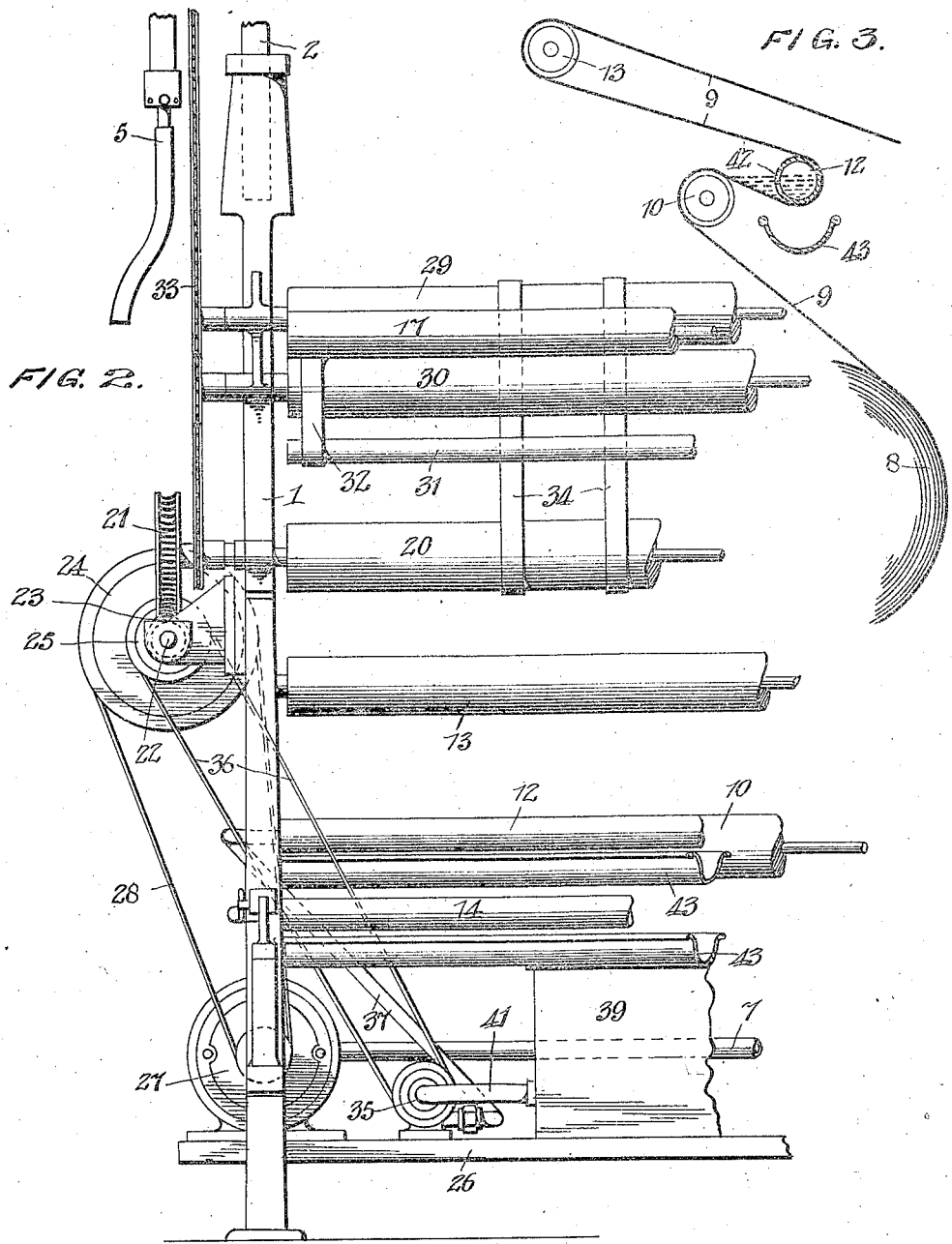

CHARLES F. PEASE, MARTHA V. PEASE, AND HENRY C. GAWLER, OF CHICAGO, ILLINOIS, ASSIGNORS TO THE C. F. PEASE BLUE PRINT MACHINERY AND SUPPLY COMPANY, OF CHICAGO, ILLINOIS, A CORPORATION OF ILLINOIS.

MACHINE FOR COATING PAPER.

952,135.  Specification of Letters Patent.  Patented Mar. 15, 1910.

Application filed November 23, 1908, Serial No. 464,195. Renewed February 2, 1910. Serial No. 541,604.

*To all whom it may concern:*

Be it known that we, CHARLES F. PEASE, MARTHA V. PEASE, and HENRY C. GAWLER, citizens of the United States, residing at Chicago, in the county of Cook and State of Illinois, have invented certain new and useful Improvements in Machines for Coating Paper, of which the following is a specification.

Our invention relates to machines for coating paper, and has particular reference to a machine which is especially adapted for the manufacture of blue-print paper.

Our invention embodies as important features thereof, novel coating mechanism and novel re-winding or re-rolling means. The last mentioned feature of the invention is not claimed herein, as claims drawn thereon will be presented in a separate application.

In the accompanying drawings, illustrating our invention, and forming a part of this specification, and wherein like numerals are used to designate like parts throughout the several figures, Figure 1 is a side elevation of the lower portion of our improved apparatus. Fig. 1ᵃ is a similar view of the upper portion thereof. Fig. 2 is a rear elevation of one side of the apparatus, broken away, and certain parts removed for clearness, and, Fig. 3 is a detail view, partly in elevation and partly in section, of the coating mechanism.

In the practical embodiment of our invention, we may advantageously provide pyramidal side frames 1, which are provided with vertical shafts 2, extending from the upper pointed ends thereof, and provided upon their upper ends with rotatively journaled rollers 3, said shafts 2 being connected in their length, by a heater 4, shown in Fig. 1ᵃ, and provided with a supply pipe 5, a portion of which is shown in Fig. 2. Adjacent their lower ends, the frames 1 are provided with forwardly extending brackets 6, between the ends of which is rotatively journaled a shaft 7, adapted to receive the paper roll 8 thereon, said roll being rotatable to deliver its paper 9 upwardly and over a roller 10 journaled between forwardly extending brackets 11 of said frames 1, above said brackets 6, provided with a coating and scraping tube 12, supported therebetween, rearwardly of roller 10, about which coating and scraping tube, said paper 9 travels forwardly and about a roller 13, rotatively journaled at the end of said brackets 11. From the roller 13, the paper 9 travels transversely through the frame 1, and rearwardly therethrough and forwardly at a slight angle beneath a second coating and scraping tube 14, from which it passes upwardly and angularly through said frame 1, again and vertically over a roller 15, journaled in the brackets 16, extending forwardly from the frame 1 adjacent the upper pointed end. From the roller 15, the paper 9 passes upwardly over the aforementioned roller 3 at the upper end of shaft 2, and downwardly again, rearwardly thereof, thereby passing and repassing the heater 4 in its upward and downward movement and in non-contacting relation. The paper 9, extending downwardly from the roller 3, passes rearwardly of and about a roller 17, mounted at the end of a bracket 18, extending rearwardly from the upper portion of the frame 1, in alinement with the forward bracket 16, carrying the roller 15.

The bracket 18 is provided with an arm 19, extending downwardly therefrom, parallel with the adjacent portion of the frame 1, at the lower end of which arm 19, is rotatively journaled a roller 20, provided upon its end extending beyond said frame 1, with a worm-wheel 21. A short shaft 22, mounted horizontally of the frame 1, and transversely of the roller 20, carries a worm 23 upon its outer end in engagement with the worm-wheel 21, and is provided upon its inner end with a pair of pulleys 24 and 25 respectively. Mounted upon a platform 26, extending between the frames 1, adjacent the bases thereof, is a motor 27, the shaft of which is provided with a pulley connected by a belt 28 to the pulley 24, of shaft 22, thereby rotating said shaft and said roller 20, through the connections described. The bracket 18 is further provided with superposed rollers 29 and 30, journaled therein, and between which the paper 9 passes from the roller 17, forwardly and downwardly over the lower roller 30 and is rewound upon a shaft 31, suspended from the lower roller 30 by belts 32. The endless driving chain 33, extends from the roller 20, forwardly and upwardly over roller 15, and downwardly over roller 3, to the upper roller 29, from which it passes between said roller 29 and the lower roller 30 therebelow, and back to roller 20, thus driving each of the enumerated rollers which are provided with sprocket wheels for this purpose.

Extending between the roller 20 and the upper roller 29 of the bracket 18, and passing rearwardly of the lower roller 30, are guiding tapes 34, against which the paper on the re-winding shaft 31 rests, and which serves to feed the paper around said shaft.

Inasmuch as the sprocket wheels of each of the rollers driven by the endless chain 33, are of the same size, the rotation of said rollers will be uniform. The rotation of the lower roller 30 of the bracket 18, causes rotation of the re-winding shaft 31 by means of the supporting belts 32, and inasmuch as the said shaft 31 is substantially smaller than the sprocket wheel of roller 30, said shaft will be rotated at a greater rate of speed with relation thereto, thereby creating the tendency of shaft 31 to rewind the paper faster than it is fed thereto. On this account, the paper will be wound more evenly and more tightly than would otherwise be the case, the belts 32 being, of course, adapted to slip about the shaft 31. Also, the weight of the re-rolled paper on shaft 31, being against the tapes 34, gives additional driving power to the outside of the roll of paper at the surface speed of paper 9.

Mounted also upon the platform 26, is a pump 35, driven by means of a belt 36, extending between the same and the pulley 25 of the driven shaft 22, said pump 35, in its operation, being adapted to force a continuous supply of the coating liquid, through a pipe 37 to the coating and scraping tube 12, upon the upper surface of the paper from which the surplus liquid is scraped by tube 12, flowing from the edges of the paper into trough 43, from which the liquid escapes through a pipe 38 through the second coating and scraping tube 14, again upon the paper from which the surplus is again wiped off, flowing from the edges of the paper into trough 43, and being conveyed to a tank 39, mounted upon platform 26, by means of a pipe 40, from which tank 39, the pump 35 is supplied, being connected thereto by a pipe 41.

Referring now to Fig. 3, which illustrates our improved means for coating paper, the coating rollers 12 and 14 embody a stationary tube, provided with a series of logitudinally alined openings 42, opening upon that portion of the paper 9, approaching said tube, and adapted to permit of the flow of the coating liquid from said tube upon the upper surface of said paper, the level of the liquid within said tube, being maintained at the height of said openings, and the surplus liquid being scraped off by the coating tube and caught as it flows from the edges of the paper, by troughs 43, arranged longitudinally beneath the coating and scraping tubes, and opening into the surplus pipes 38 and 40 of the coating and scraping tubes 12 and 14 respectively.

From the foregoing description, the operation of our improved machine will be readily apparent, and need not be further gone into. It should be understood, however, that we may employ only one coating and scraping tube instead of two and that the said coating mechanism and our improved rewinding mechanism may each be used in different types of machines than the one herein shown and described.

The particular form of drying means shown, while well adapted for use in connection with the present invention, forms no part thereof, and is by no means essential thereto. Any other suitable form of drier may be employed. Similarly, any other suitable re-winding or re-rolling means may be used if desired.

While the machine hereinbefore referred to is described as a machine for coating paper, it is to be clearly understood that the machine is adapted to apply developing, washing or other liquids to the paper and that such use of our invention is contemplated.

Having fully described our invention, we claim:

1. In a machine for coating paper, the combination of a supporting frame, a paper roll mounted therein, a coating tube arranged in the path of movement of the paper, from said paper roll, to receive the same thereunder, and provided with openings to deliver a coating fluid forwardly upon the said paper, means for feeding the coating liquid to said tube, and maintaining the liquid level therein at said openings, and means to elevate the paper to permit an accumulated supply of the coating fluid thereupon, forwardly of said coating tube, substantially as described.

2. In a machine of the character described, the combination of a supporting frame, a paper roll mounted therein, coating mechanisms arranged in the path of movement of the paper from said paper roll, to successively receive and coat the same, and arranged to over-flow their coating fluid upon the paper forwardly thereof, means for feeding a coating fluid to one of said coating mechanisms, and means to feed the other of said coating mechanisms from the overflow of said first named mechanism, substantially as described.

In testimony whereof we affix our signatures in presence of two witnesses.

CHARLES F. PEASE.
MARTHA V. PEASE.
HENRY C. GAWLER.

Witnesses:
  Miss L. E. ELSEA,
  Miss F. E. VISE.